W. C. LONG.
DEMOUNTABLE RIM.
APPLICATION FILED JULY 20, 1915.
1,237,349.
Patented Aug. 21, 1917.
2 SHEETS—SHEET 1.
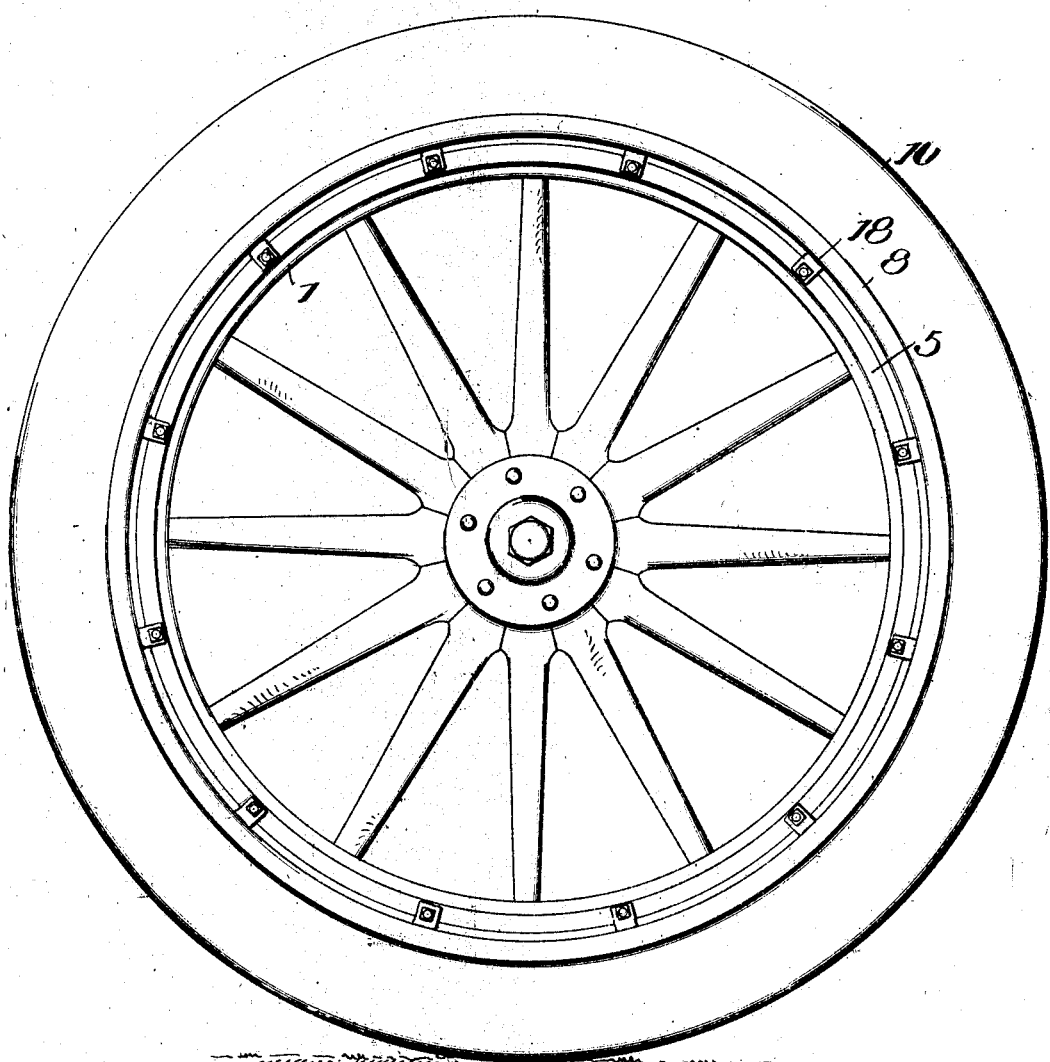
Inventor
W. C. Long
By
[signature], Attorneys

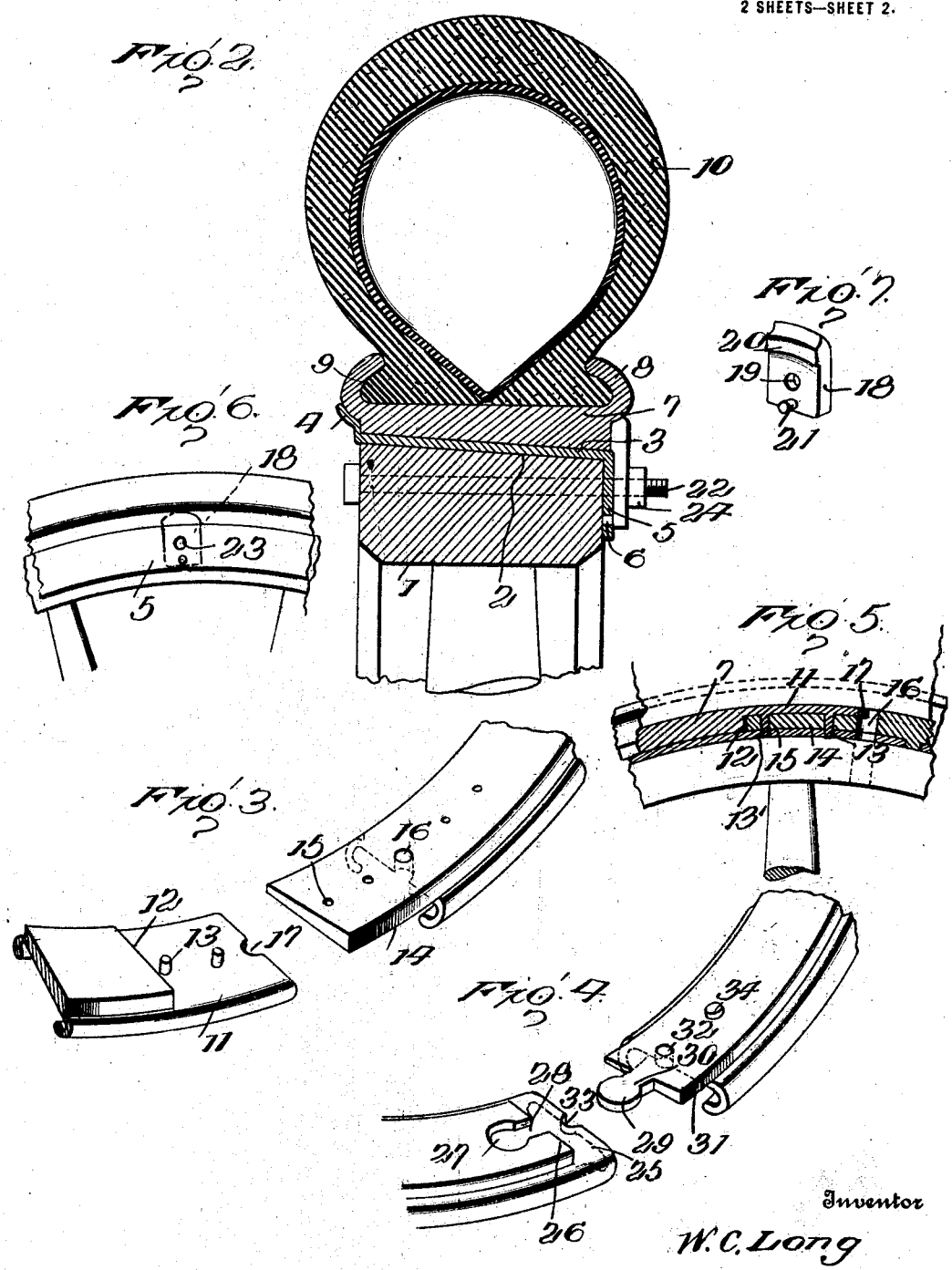

UNITED STATES PATENT OFFICE.

WALTER C. LONG, OF LOUDONVILLE, OHIO.

DEMOUNTABLE RIM.

1,237,349.  Specification of Letters Patent.  Patented Aug. 21, 1917.

Application filed July 20, 1915. Serial No. 40,992.

*To all whom it may concern:*

Be it known that I, WALTER C. LONG, a citizen of the United States, residing at Loudonville, in the county of Ashland and State of Ohio, have invented certain new and useful Improvements in Demountable Rims, of which the following is a specification.

This invention relates to improvements in vehicle wheels and more particularly to a novel demountable rim and means for securing the same in place upon the felly band of the wheel.

It is one aim of the invention to provide a demountable rim which may be readily and quickly manipulated so as to permit of its being disengaged from the tire casing when it is desired to remove the said casing for any purpose, and which will, nevertheless, be so constructed as to securely hold the casing when in place upon the wheel and will not be liable to become accidentally displaced.

The rim embodying the present invention is in the form of an open annulus and the invention aims to provide novel means for firmly and securely connecting the ends of the rim and for holding these ends against separation when the rim is in place upon the felly band.

Another aim of the invention is to provide novel means for accommodating the induction tube for the inner tube of the tire.

In the accompanying drawings:

Figure 1 is a side elevation of a wheel equipped with the rim embodying the present invention.

Fig. 2 is a vertical transverse sectional view through the device.

Fig. 3 is a perspective view of the meeting ends of the demountable tire rim in position about to be connected.

Fig. 4 is a similar view illustrating a modified form of connection for the ends of the rim.

Fig. 5 is a longitudinal sectional view through that form of the rim shown in Fig. 3 of the drawings.

Fig. 6 is a side elevation of the structure removed from the felly of the wheel.

Fig. 7 is a perspective view of one of the clamps for holding the tire rim in place upon the felly band.

Corresponding and like parts are referred to in the following description and indicated in all the views of the accompanying drawings by the same reference characters.

In the drawings, the numeral 1 indicates the felly of the wheel and this felly is peripherally of frusto-conical form or, in other words, is exteriorly tapered toward one side of the wheel as indicated at 2. The felly band of the wheel is indicated by the numeral 3 and the body portion thereof is of frusto-conical form and adapted to be fitted snugly to the peripheral surface of the felly 1 in the manner clearly shown in Fig. 2 of the drawings. At one side of the wheel the felly band 3 is provided with a flange 4 against which the tire rim is to be disposed and held in a manner to be presently explained. At its opposite side the band 3 is provided with an inwardly projecting flange 5 which, when the band is in place upon the felly 1, rests against one side face of the said felly, as clearly shown in the said Fig. 2. For a purpose also to be presently explained, the flange 5 is provided at intervals with openings 6.

The demountable tire rim, as before stated, is in the form of an open annulus and the body of this rim is indicated by the numeral 7 and is exteriorly cylindrical and provided at its opposite sides with flanges 8 of the ordinary form to engage and grip the beads 9 of the tire casing, which casing is indicated by the numeral 10. Interiorly the rim 7 is of frusto-conical form and the rim is adapted to be fitted to the felly band with its inner surface snugly fitting the outer surface of the said band. In that form of the invention shown in Fig. 3 of the drawings, the rim at one end is reduced in thickness, as indicated at 11 to form a transverse shoulder 12 and studs 13 are provided upon the inner surface of the reduced portion 11, preferably in alinement circumferentially of the rim. The opposite end of the rim is also reduced in thickness, as indicated at 14, and provided with openings 15 designed to receive the studs 13 when the portions 11 and 14 of the said ends of the rim are brought together in overlapped relation in the manner clearly shown in Fig. 5 of the drawings. When the ends of the rim are thus connected the end of the portion 14 will abut against the shoulder 12 and the studs 13 will fit snugly within the openings 15. In order that the induction tube for the inner tube of the tire may be accommodated, the rim is formed at that end at which the portion 14 is located, and substantially at the line of juncture of this portion with the said end of the rim with an opening 16 designed to register with a notch or recess 17 formed in the extremity of the reduced portion 11 of the opposite end of the rim when the two ends are assembled, as above stated, the said induction tube for the inner tube of the tire being fitted through the opening 16 and received within this opening and within the concavity of the recess 17.

At this point it will be understood that when the rim is to be applied to the tire casing, it is contracted until its ends project past each other and the rim is then disposed within the tire casing and permitted to expand by its resiliency, the beads 9 of the casing being at the same time engaged with the flanges 8. As the rim expands, its reduced end portions will assume an overlapped relation and the studs 13 will engage the openings 15, thereby connecting the said ends in the manner clearly shown in Fig. 5. The rim may then be readily fitted onto the felly band 3 and secured in place by means of a suitable number of clamps of the structure shown in Fig. 7 of the drawings.

Each of the clamps above mentioned comprises a body portion 18 formed with an opening 19 and at one end with a lip 20 projecting from one face thereof and at its other end with a stud 21 also projecting from the said face. Any desired number of these clamps may be employed and they are disposed in the position shown in Fig. 2 of the drawings, or, in other words, against the flange 5 of the felly band with the studs 21 projecting into the openings 6 in the said band and with the lips 20 engaging against the adjacent side of the tire rim, as shown in the said figure. Bolts 22 are fitted through the felly 1 and through openings 23 formed in the flange 5 for their reception and through the openings 9 in the clamps, and nuts 24 are threaded onto the ends of the bolts and bear against the said clamps and serve to bind the same against the tire rim. It will be understood that the engagement of the studs 21 in the openings 6 serves to prevent rotation of the clamps to position out of engagement with the tire rim but that, when it is desired to remove the rim, the nuts 24 may be turned back until the studs 21 may be disengaged from within the openings 6, whereupon the clamps may be rotated upon their respective bolts so as to provide clearance for the said tire rim.

In that form of the invention shown in Fig. 4 of the drawings, one end of the rim is reduced in thickness as indicated by the numeral 25 and the reduction in thickness of this end results in a transverse shoulder 26. The rim is formed in its inner side with a recess 27 having a restricted throat 28 opening at the said shoulder 26 and this recess is designed to receive the head 29 and neck 30 of a connecting element provided at the opposite end of the rim, the last mentioned end of the rim being also reduced in thickness, as indicated in Fig. 1, and its extremity being designed to abut against the shoulder 26 in the same manner as in the instance of the portion 14 in the shoulder 12 in the form previously described. As in the previously described form of the invention, one end of the rim is provided with an opening 32 and the other end with a notch 33, corresponding respectively to the opening 16 and notch 17, and designed to accommodate the retraction or inflation tube for the inner tube of the tire.

In order that the rim may be prevented from creeping about the felly band 3 of the wheel, the studs 13 are formed of such length that they will project not only through the openings 13 but will also engage at their free ends in openings 13' formed in said felly band. In that form of the invention shown in Fig. 4 the result stated is accomplished by forming the rim member with a stud, indicated by the numeral 34, which in the same manner as the studs 13, engages in an opening in the said band.

Having thus described the invention, what is claimed as new is:

A demountable rim comprising a body in the form of an open annulus provided at its sides with tire casing engaging flanges, the flanges at one end of the body terminating short of said end and the body at its other end being recessed at its under side to form a shoulder spaced inwardly from its said end, the first mentioned end of the body being arranged to overlap the projecting portion at the other end of the body, in the mounted position of the tire, with the ends of the flanges abutting and with the projecting first mentioned end of the rim abutting against the said shoulder at the other end of the rim, and spaced studs arranged in circumferential alinement upon the inner face of the projecting portion at the second mentioned end of the rim, the said projecting first mentioned end of the rim being provided with sockets to receive the said studs.

In testimony whereof I affix my signature.

WALTER C. LONG. [L. S.]